Figure 1:
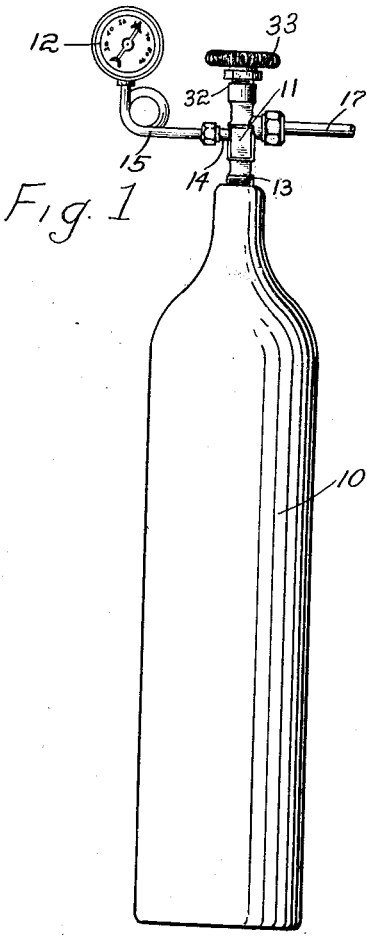

S. G. MALBY.
GAS VALVE.
APPLICATION FILED SEPT. 18, 1919.

1,328,578.

Patented Jan. 20, 1920.

WITNESSES:
Chester F. Hayden.

INVENTOR
Seth G. Malby
BY
A. M. Wooster
ATTORNEY

UNITED STATES PATENT OFFICE.

SETH G. MALBY, OF DERBY, CONNECTICUT, ASSIGNOR TO ANSONIA MANUFACTURING COMPANY, OF ANSONIA, CONNECTICUT, A CORPORATION OF CONNECTICUT.

GAS-VALVE.

1,328,578.

Specification of Letters Patent.   Patented Jan. 20, 1920.

Application filed September 18, 1919.   Serial No. 324,384.

*To all whom it may concern:*

Be it known that I, SETH G. MALBY, a citizen of the United States, residing at Derby, county of New Haven, State of Connecticut, have invented an Improvement in Gas-Valves, of which the following is a specification.

This invention relates to gas valves generally and is especially adapted for use upon the portable cylinders used in supplying gases for various uses, as in hospitals, dental offices, soda fountains and for welding and other torches, and the invention has for its object to provide an improved valve that will be practically fool proof and eliminate danger of the loss of use of the gas in a cylinder through inability to open the valve which has heretofore rendered it necessary to return the cylinder to the manufacturer, and to obviate the loss of the contents of cylinders through inability to prevent escape of gas after the valve has been opened, owing to distortion of parts in opening.

Among the various requirements are that valves of this type be able to withstand enormous gas pressure without leaking and at the same time that they be relatively easy to operate. In order to accomplish these results it has heretofore been necessary to provide a structure in which the valve stem could be rotated easily without longitudinal movement, and a connection between the valve stem and the plug or valve proper, that would permit both rotary and longitudinal movement of the plug when the stem was rotated. It has been a serious objection to the valves of this type heretofore known to the trade that if the operator at the place of manufacture or at the filling station should turn down the plug unnecessarily hard in closing the cylinder for shipment, some of the parts were liable to be distorted to such an extent as to render it practically impossible to open the cylinder and make it necessary to ship it back, and in other cases where the operator at the place of use succeeded in opening the valve, owing to distortion of the parts in opening, it has been impossible to shut off the flow of gas and so the content of the cylinder has been wasted.

In order to avoid these difficulties and to provide a valve that not only cannot be distorted or injured in any way by the application of undue pressure in closing the cylinder at the factory, which can be opened by the user even if closed unnecessarily tight, and which can be closed by the operator after use and thus caused to retain the portion of the content not used and without waste, I have devised the novel structure which I will now describe referring to the accompanying drawing forming a part of this specification and using reference characters to indicate the several parts.

Figure 2:
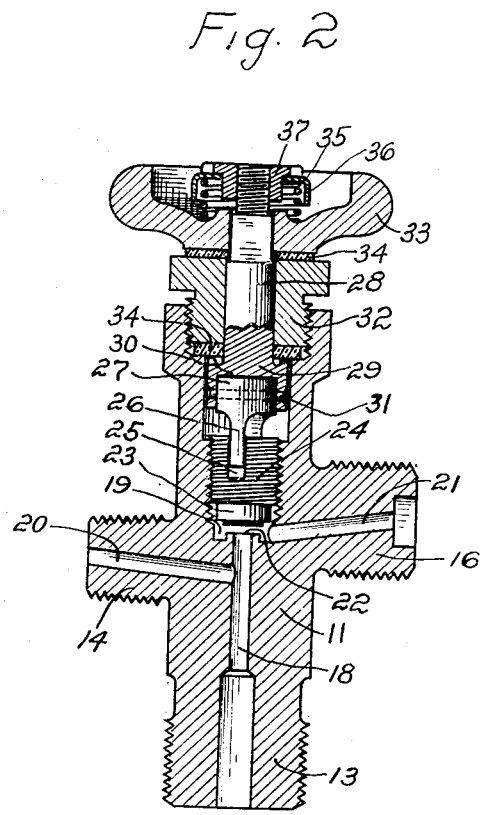
Figure 3:
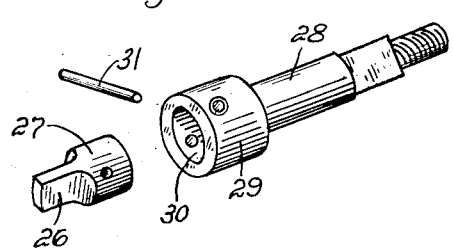

Figure 1 is an elevation of a gas cylinder with valve and pressure gage in place as in use;

Fig. 2 a longitudinal section on an enlarged scale of the valve detached, certain of the parts being in elevation, and Fig. 3 is a disassembled view of the essential parts of the present invention.

10 denotes an ordinary gas cylinder, 11 the valve as a whole, and 12 the pressure gage. The body of the valve comprises a hub 13, externally threaded for engagement with the cylinder, a hub 14 to which the pressure gage pipe 15 is secured, and a hub 16 to which the service pipe 17 is secured. A passage 18 leads through hub 13 to a chamber 19 which extends to the other end of the body and contains the valve plug and other operative parts of the structure. A passage 20 leads from passage 18 through hub 14 and a passage 21 leads from chamber 19 through hub 16, to which the service pipe is connected. At the inner end of chamber 19 and surrounding the inner end of passage 18 is a valve seat 22. This seat is adapted to be engaged by a plug 23 which is externally threaded, as at 24, to engage a corresponding thread in the wall of chamber 19. The plug is provided with a transverse slot 25 which is engaged by a key 26, having an enlarged circular head 27. 28 denotes the valve stem which is provided at its inner end with a head 29 having in its face a socket 30 which just receives the head 27 of the key. The key is detachably secured to the valve stem by means of a soft metal pin 31 which passes through alined holes in the wall of socket 30 and through the head 27 of the key. The valve stem is rotatable in a screw plug 32 which has threaded engagement with the body at the outer end of chamber 19. At the outer end of the valve stem is a hand wheel 33. Packing washers 34 are placed between the hand wheel and the screw plug and between the screw plug and the rear face of head 29 of the valve stem, said face being shown as provided with a circular rib, which engages the washer. A spring 35 held in place by a cap 36 and a nut 37 at the outer end of the valve stem acts to draw the hand wheel and head 29 toward each other which compresses the packing washers and effectually prevents the escape of gas.

The operation is as follows: It will of course be understood that forward rotation of the valve stem by means of the hand wheel will cause rotation of the threaded plug and cause it to engage the valve seat, while backward rotation of the valve stem will cause the plug to move away from the valve seat, the plug being free to move longitudinally with relation to the key. Suppose now that in filling the cylinder the operator at the factory or filling station, after having seated the plug on the valve seat, continues to apply pressure as with a heavy wrench, something will break or be twisted out of shape. My present invention provides the key with a round head which fits in a round socket in another head at the inner end of the valve stem, the key and valve stem being secured together by means of a soft metal pin which passes through both. This pin is strong enough to stand up to its work in opening or closing the valve but should undue strain be applied to the hand wheel (a wrench is frequently used) the pin will shear but without injury to any of the other parts. Suppose now that at the place of use the operator tries to open the valve, it is quite probable that he would be unable to do so on account of the shearing of the pin. The operators at the places of use are supplied with extra pins. It would only be necessary therefore to turn out screw plug 32, remove the valve stem and key as a unit, disassemble and drive out the parts of the sheared pin, attach the key to the valve stem by means of a new pin and return the parts to place after which the valve may be opened in the usual manner, the operation being a comparatively easy one and enabling the operator to use the contents of the cylinder with but slight delay.

On the other hand it might happen that while the pin had been partly sheared at the factory or filling station, the operator at the place of use might be able to open the valve but would be unable to close it tightly enough to prevent leakage of gas. In such a case the operator would remove the valve stem and key as before, tighten up the valve with a screw driver to prevent leakage, and then put in a new pin and assemble the parts as before ready for use.

Having thus described my invention, I claim:

1. A device of the character described comprising a chamber, a threaded plug for closing said chamber, a rotatable key engaging said plug, rotation of the key imparting both rotary and longitudinal movement to the plug, a removable valve stem, and a soft metal pin securing the key to the valve stem.

2. A device of the character described comprising a chamber, a threaded plug adapted to close said chamber and provided with a slot, a key engaging said slot and provided with a circular head, a valve stem having a socket which receives said head, and a soft metal pin passing through the walls of the socket and the head of the key.

3. A device of the character described comprising a chamber, a threaded plug adapted to close said chamber and provided with a slot, a key engaging said slot and provided with a circular head, a valve stem having a socket which receives said head, a soft metal pin passing through the walls of the socket and the head of the key, and a removable screw plug which carries the valve stem.

4. A device of the character described comprising a body having a chamber with an internal screw thread and a valve seat, a correspondingly threaded plug which is adapted to engage the valve seat and is provided with a transverse slot, a key engaging said slot and having a circular head, a valve stem having a head with a socket to receive the head of the key, a soft metal pin by which the key and valve stem are secured together, a screw plug engaging the body and carrying the valve stem, a longitudinally movable hand wheel on the valve stem, packing washers between the screw plug and the hand wheel and the head of the valve stem, and means for drawing said head and hand wheel toward each other to compress the washers and prevent escape of gas.

5. A device of the character described comprising a body having a valve seat, a coöperating plug having threaded engagement with the body, and a slot, a key engaging the slot and having a circular head, a stem having a socket to receive the head, and a soft metal pin passing through the walls of the socket and the head.

In testimony whereof I affix my signature.

SETH G. MALBY.